United States Patent [19]

Lee et al.

[11] Patent Number: 5,074,520
[45] Date of Patent: Dec. 24, 1991

[54] AUTOMATIC MIXING FAUCET

[76] Inventors: Chang H. Lee, 1225 Broadway, New York, N.Y. 10001; Young Jun Kim, Seoul, Rep. of Korea

[21] Appl. No.: 467,738

[22] Filed: Jan. 19, 1990

Related U.S. Application Data

[63] Continuation-in-part of Ser. No. 374,666, Jun. 30, 1989, which is a continuation-in-part of Ser. No. 359,994, Jun. 1, 1989, Pat. No. 4,953,236, which is a continuation of Ser. No. 244,135, Sep. 14, 1988, Pat. No. 4,886,207.

[51] Int. Cl.$^5$ .......................... F16K 31/12; F03C 1/05
[52] U.S. Cl. .................... 251/40; 251/124.04; 4/623
[58] Field of Search ................ 4/623; 251/40, 129.04; 250/221

[56] References Cited

U.S. PATENT DOCUMENTS

| | | | |
|---|---|---|---|
| 2,635,691 | 4/1953 | Filliung | 251/40 X |
| 3,638,680 | 2/1972 | Kopp | 137/607 X |
| 4,741,363 | 5/1988 | Hu | 137/607 |
| 4,762,273 | 8/1988 | Gregory et al. | 236/93 R |
| 4,893,005 | 1/1990 | Stiebel | 250/221 |

Primary Examiner—William E. Wayner
Attorney, Agent, or Firm—Pasquale A. Razzano

[57] ABSTRACT

An automatic faucet is disclosed which includes a faucet body having a water discharge end and sensors mounted on the faucet for sensing the presence or absence of an object adjacent the faucet. A water supply valve is located in the faucet body which includes a diaphragm type primary valve to control discharge of water from the faucet. Operation of the prinmary valve is controlled by a motor operated in response to a signal produced by the sensor when an object, e.g., hands, are placed beneath the faucet.

7 Claims, 6 Drawing Sheets

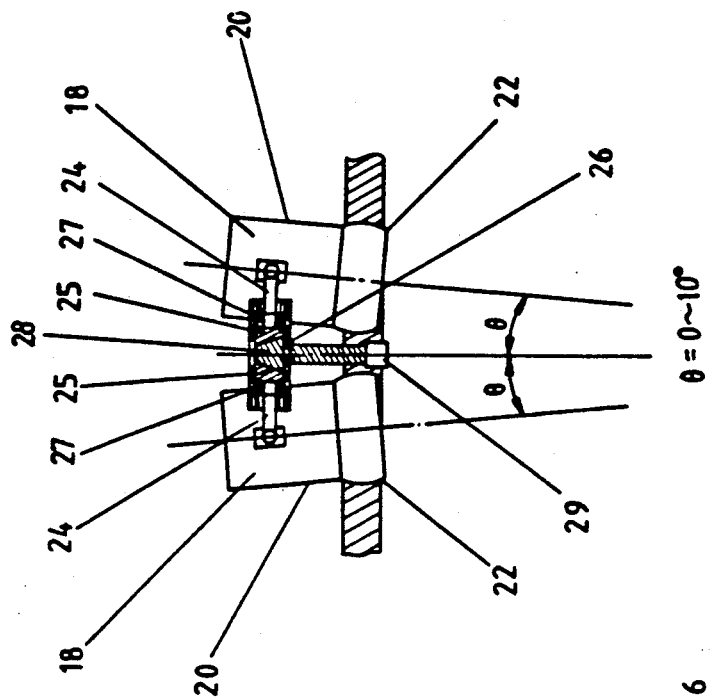
FIG. 7
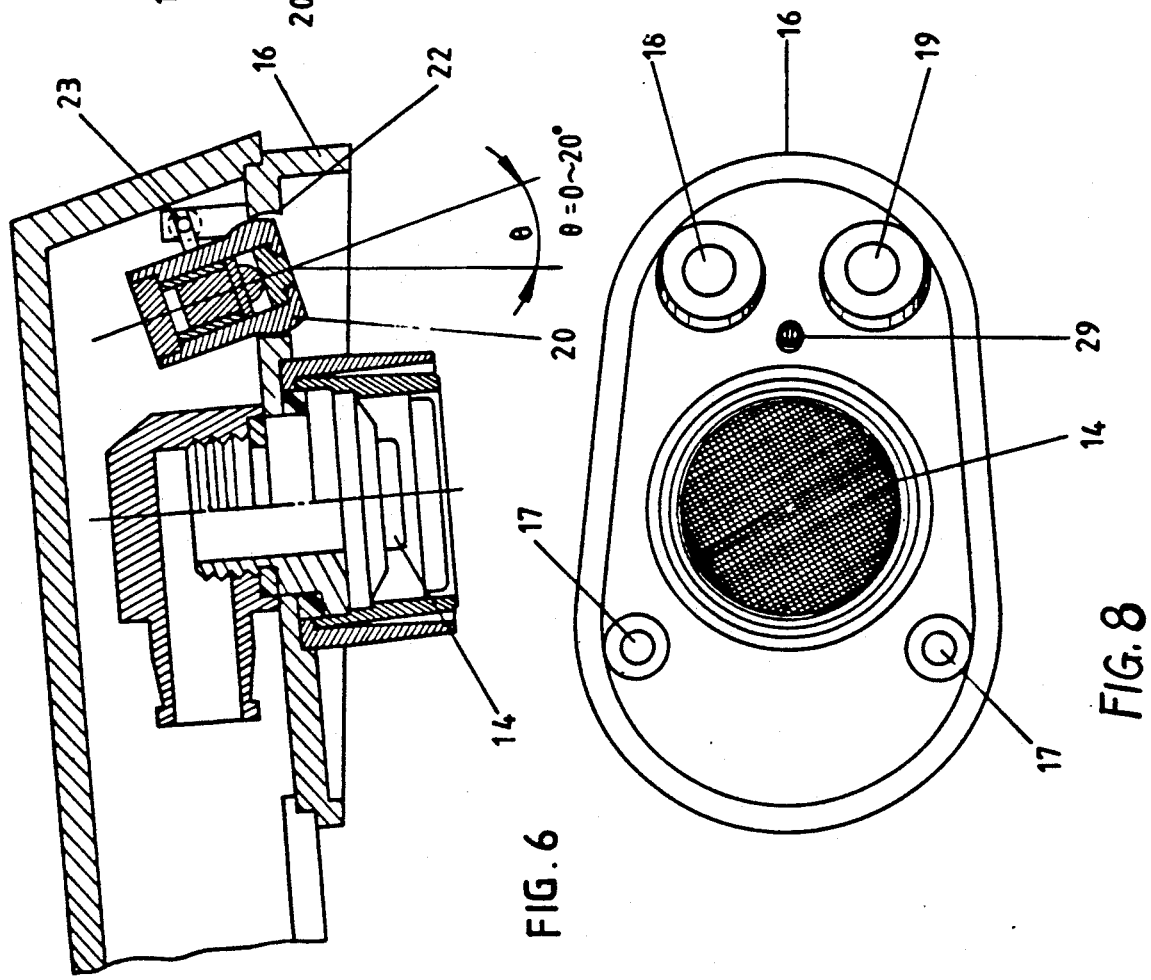
FIG. 6
FIG. 8

AUTOMATIC MIXING FAUCET

This application is a continuation-in-part of U.S. patent application Ser. No. 374,666, filed June 30, 1989, which is a continuation-in-part of U.S. patent application Ser. No. 359,994, filed June 1, 1989, (now U.S. Pat. No. 4,953,236 which is a continuation of U.S. patent application Ser. No. 244,135, filed Sept. 14, 1988, now U.S. Pat. No. 4,886,207.

BACKGROUND OF THE INVENTION

The present invention relates to a service water tap or faucet which automatically controls operation and discharge of a water supply.

More specifically, the invention relates to an automatic service water tap or faucet which includes a compact faucet body or spout on which are mounted an emitter and detector operable to control the flow of water. The emitter, detector and an aerator are installed in a nozzle cover mounted on the outlet end of the faucet body. To prevent inadvertent operation of the faucet by reflected light, the emitter and detector are mounted at an angular position of 0° to 70° from the vertical and at an angle of between 0° and 20° with respect to each other from the parallel, with the optimum position and angle being adjustable.

A water controller, an electronic circuit (hybrid IC), and a hot and cold mixing valve are installed compactly inside the faucet body.

PRIOR ART

Heretofore, there have been service water taps intended to be controlled automatically with an ON/OFF operation of a water supply valve by utilizing a detecting sensor. One such system is disclosed in U.S. Pat. No. 4,741,363. However, in such previously proposed devices the components are arranged independently and then connected to each other so that they could not be made small-sized and lightweight by integrating every component as an article. Therefore, the desired effects were not obtained because establishing operation of the device was not easy and the external appearance was unsatisfactory.

In our prior patent applications, identified above, the disclosures of which are incorporated herein by reference, we disclosed improved automatic water taps or faucets which are compact in design and efficient in operation. Such devices minimized water hammer shock in automatic faucets, lengthened the operating time for the opening and closing action of the valve as compared to a conventional water supply valve, and prevented sudden opening and closing of the valve.

By the present invention a still more compact automatic faucet is provided which utilizes a reduced number of parts in a simplified structure. The faucet makes advantageous use of a diaphragm type primary valve operated under the control of the electronic sensor. Diaphragm type valves, per se, are known in the plumbing industry and are commonly used in urinals. Such valves are supplied, for example, by the Sloan Valves Company, Franklin Park, Illinois. However, such valves have not been used in automatic faucets under automatic control as described hereinafter.

OBJECTS OF THE INVENTION

It is an object of the present invention to provide an automatic faucet whose operation is completely automized.

It is another object of the invention to provide an automatic faucet in which all of the operative components are located within the body of the faucet, so that it can be of compact, small-size and of good appearance.

Another object of the invention is to provide an automatic faucet which can be easily installed in place of an existing faucet.

A further object of the invention is to avoid malfunctions and inadvertent operation of the automatic faucet caused by reflected light.

A still further object of the invention is to reduce operating costs by reducing breakdowns or leaking caused by heavy use of the faucet.

Yet another object of the present invention is to provide an automatic service water tap which can be substituted for an existing conventional service water tap while keeping all of the other remaining facilities (i.e., plumbing lines) as they were without any damage.

A further object of the invention is to provide an automatic service water tap which can be easily installed without providing new electric power lines so that the construction cost will be greatly decreased and so that the device can be utilized semi-permanently.

A still further object of the present invention is to provide an automatic service water tap which has an energy saving and economical effect, by allowing the automatic service water tap to be changed easily without any difficulties in existing buildings.

It is another object of the present invention to provide an automatic water supply valve which utilizes a diaphragm type primary valve.

SUMMARY OF THE INVENTION

In accordance with an aspect of the present invention, an automatic faucet is provided in which the opening and closing operation of a water supply valve is controlled automatically by a signal produced by a sensor device which detects the presence of an object below the faucet. When a signal emitted from the emitting element of the sensor reflects from a physical object, it will be received by the photo detector of the sensor. This detecting signal inputs to the electronic control circuits of the device through an amplifier. The processed signal from the amplifier controls the water supply valve through a valve controller so that water flows out of, or stops flowing through, the automatic faucet.

Opening and closing of the water supply valve is performed by a diaphragm type primary valve. The stem of the valve is rocked to open or close the valve by a motor driven cam adjusted in response to the presence or absence of an object beneath the faucet.

A temperature sensor maintains the set water temperature by sensing temperature change in the water. That sensor is installed to maintain the temperature of the water which flows out of the automatic faucet. The amount of water which flows out from the faucet may also be controlled.

When hands or physical objects are placed in the detecting range of the sensor after the temperature control knob to set the desired temperature and the water flow control knob adjusted to set the amount of water appropriately, water of desired temperature and amount will flow automatically.

The automatic faucet of the present invention can be used for more than three years with a small battery, because the power consumption of the water supply valve and the sensor is minimized.

The above and other objects, features and advantages of the present invention will be apparent from the following detailed description of an illustrative embodiment which is to be read in connection with the accompanying drawing wherein:

BRIEF DESCRIPTION OF THE DRAWINGS

FIG. 6 is a sectional view of the aerator and sensor mounting for the embodiment of FIG. 1;

FIG. 7 is an enlarged sectional view taken along line 7—7 of FIG. 6; and

FIG. 8 is a bottom view of the aerator and sensor mount shown in FIG. 6.

DETAILED DESCRIPTION OF THE INVENTION

Figure 1:
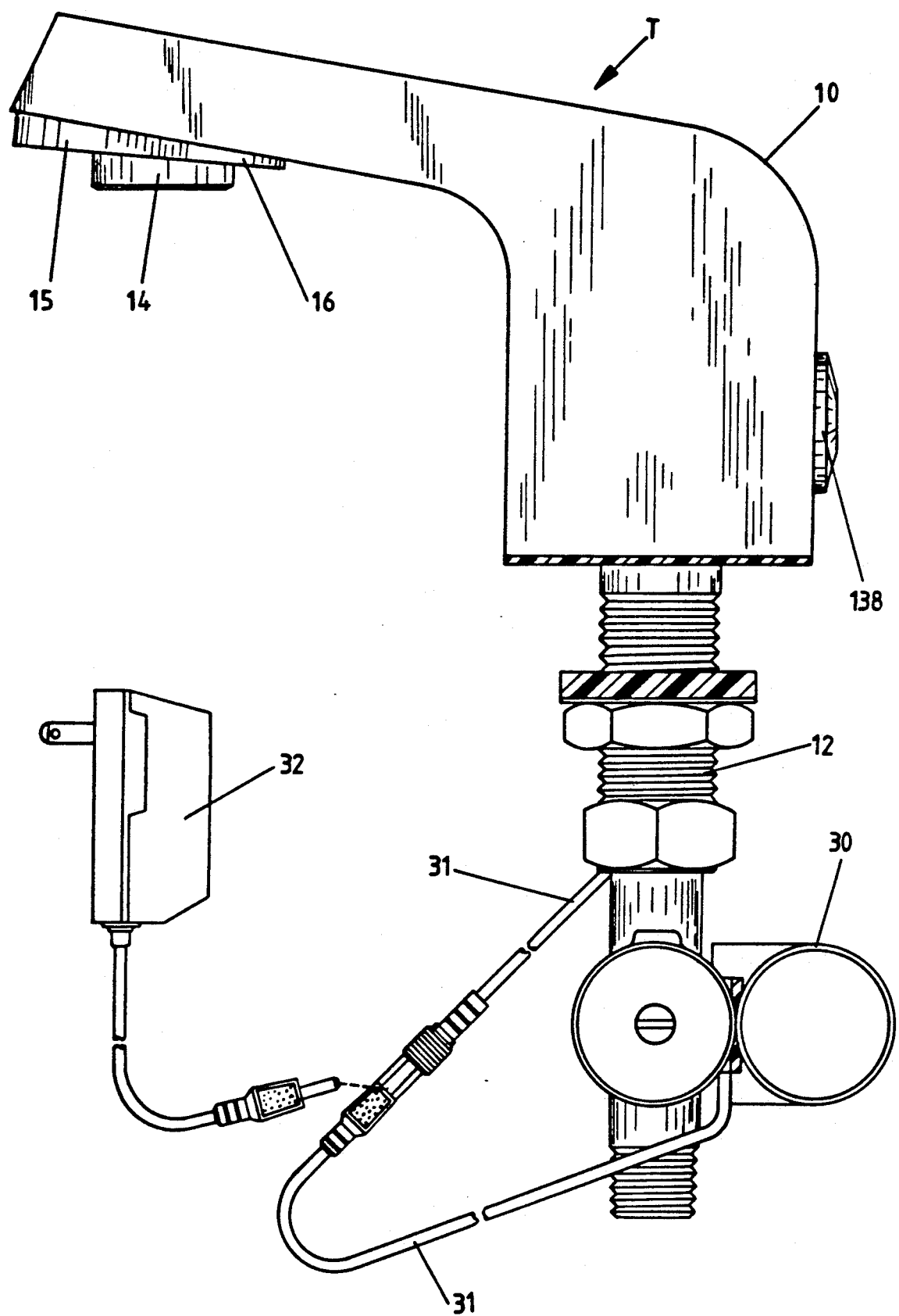
FIG. 1 is a side view of an automatic faucet according to the present invention.

Referring now to the drawings, and initially to FIG. 1 thereof, an automatic faucet "T" according to the present invention is illustrated which includes a faucet body 10, a mounting stem 12 to which hot and cold water supply lines are connected, and electronic control circuits (hybrid IC), not shown in FIG. 1. An aerator 14 and sensor 15 are installed as a unit on a nozzle cover 16 at the discharge end of the faucet. As seen in FIG. 6, the aerator 14, which may be of conventional construction, is threaded into the nozzle cover 16 which, in turn, is mounted to faucet body 10 by screws 17 or the like. Sensor 15 consists of an emitter 18 and detector 19 mounted in any convenient manner in housing 20 which have bulbous ends received in circular openings 22 of cover 16. The emitter and sensor are mounted at an angle of 0° to 70° from the vertical (FIG. 6). They are maintained in this position by arms 23 extending from housing 20 and connected to the arms 24 of plungers 25. These plungers are located in a cylinder 26 and biased towards each other by spring 27. A cam 28 is located between the plungers and can be rotated by an adjustment screw 29 thereby to move plungers 26 towards or away form each other and adjust the angular position of the detector and emitter with respect to each other. As seen in FIG. 7, the relative angle between the detector and emitter is preferably adjustable between 0° to 70°.

A battery case 30 may be installed in a remote location and connected by cables 31 to the electrical components of the faucet. Alternatively, an external AC power supply 32 can be used.

Figure 3:
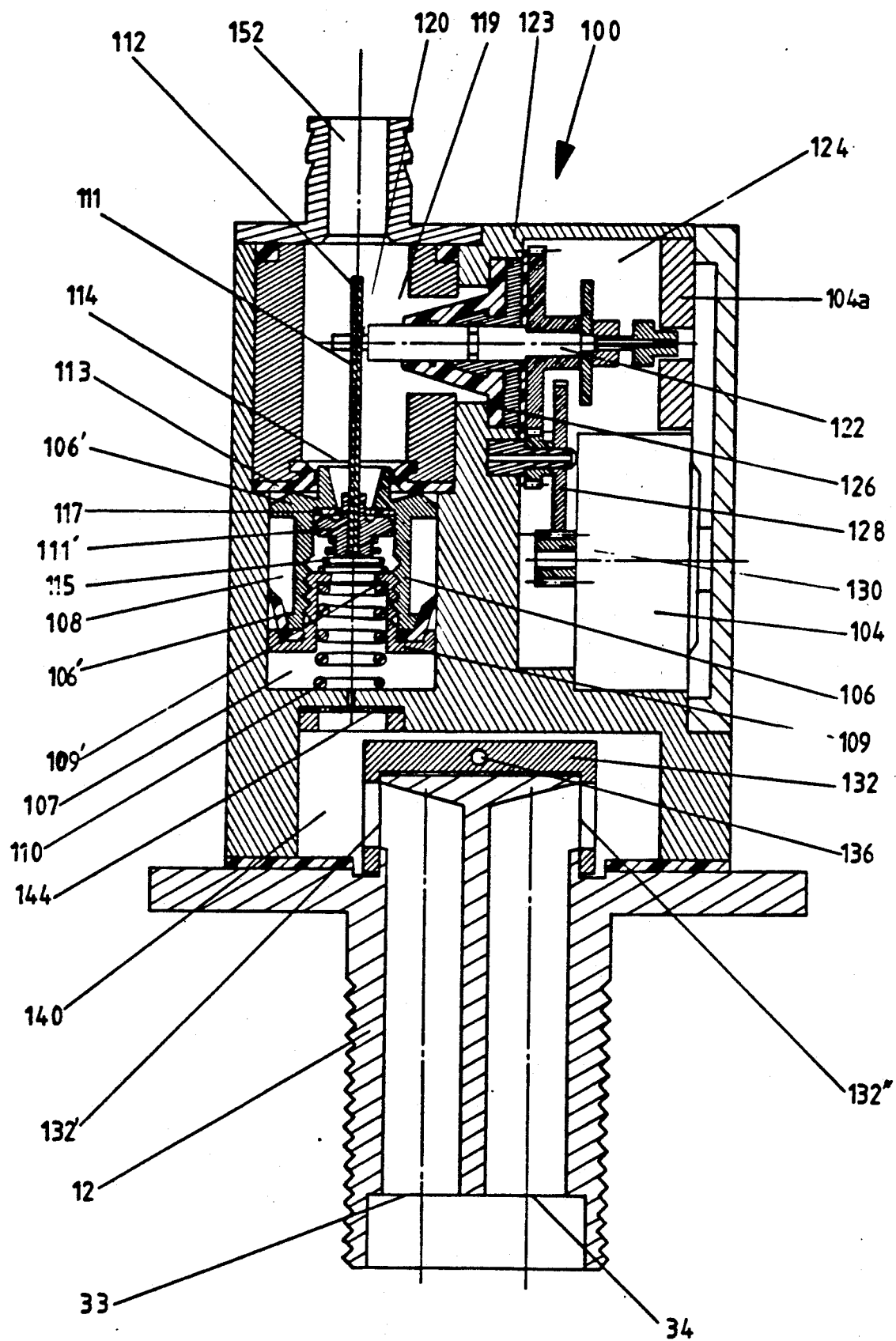
FIG. 3 is a sectional view taken along line 3—3 of FIG. 2 illustrating the closed position of the valve.

Hot and cold water is supplied to the faucet through water supply pipes (not shown) connected to ports 33, 34 in the mounting stem 12 (FIG. 3).

A water supply valve 100 is located within faucet body 10 for controlling water discharge form the faucet. The valve body includes a main chamber 101 formed therein containing a valve piston 106 and diaphragm type primary valve 111. Operation of the valve is controlled by a small DC motor 104 contained within the body of valve 100.

Valve piston 106 has a generally cylindrical shape, open at both ends and is adapted to slide in chamber 101. The cylindrical piston 106 has an annular flange, 106' formed at its upper end and an annular sealing ring 106" mounted on it slower end. Seal 106" serves to effectively divide chamber 101 into a first upper chamber 108 (located between flange 106' and seal 106") and a second lower chamber 107. The lower end of piston 106 includes a cap member 109 which secures seal 106" in place and which has an inner annular flange element 109' located within piston valve 106. The valve piston 106 is normally urged upwardly by a coil spring 110 engaged between flange 109' and the valve body.

In the closed position of valve piston 106, flange 106' is held against a seal 113 mounted at the opening 114 at the upper end of chamber 101.

Movement of valve piston 106 is controlled by the diaphragm type primary valve 111, whose lower end is located within piston 106. Valve 111 serves as a pressure relief valve and is controlled by motor 104 which serves to tilt the stem 112 of valve 111 to operate the valve. More particularly valve 111 includes a dish shaped lower end 111' and the stem 112 which extends upwardly out of piston 106. Valve 111 is supported in piston 106 on flange 109' of cap 109 by a porous conical spring member 115, so that the lower end 111' of valve 111 is normally held against seal 117 in the upper end of piston 106 thereby to normally seal the upper end of piston 106.

The upper end of shaft 112 extends through the opening 114 form chamber 101 into an upper chamber 119 where it is engaged by a cam pin 120 formed on the end of a cam shaft 122. The cam shaft is rotatably mounted in body 100 in a wall 123 which separates chamber 119 from a third chamber 124 in which motor 104 is located. A water seal 126 surrounds shaft 120 and prevents water from passing from chamber 119 to chamber 124.

Cam shaft 122 is driven through a gear train 128, as illustrated in FIG. 3, from a gear 130 mounted on the output shaft of motor 104. By this arrangement valve stem 112 will be rocked or tilted between the positions shown in FIGS. 2 and 3 upon actuation of motor 104. The latter is activated by a driver signal generated in response to the presence of an object beneath the sensor 15.

Figure 2:
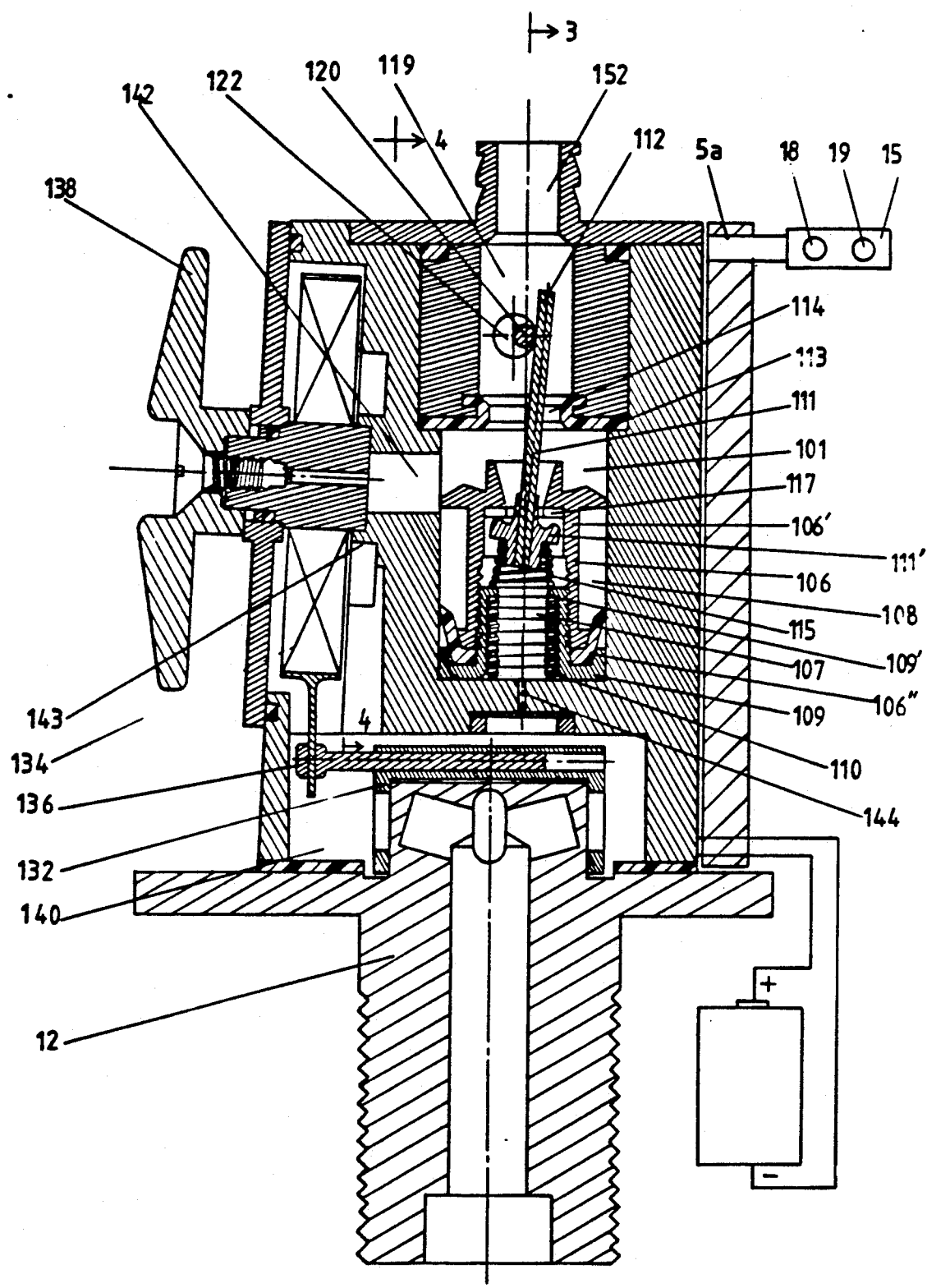
FIG. 2 is a partial cross-sectional view from the right side as seen in FIG. 1 showing the valve in its open position.

Valve body 100 also contains a hot and cold water mixing valve 132 controlled by a temperature sensor 134 (FIG. 2). Valve 132 consists of a cylindrical cap rotatably mounted on the upper end of stem 12. The cylindrical side wall of cap 132 has a pair of generally opposed elongated openings 132' and 132" formed therein located to generally align with the open ends of the hot and cold water supply ports 33, 34 in stem 12. Rotation of cap 132 will control the amount of hot and cold water flowing from ports 33 and 34, by increasing water flow from one port while decreasing flow from the other, thereby controlling the mixing of hot and cold water.

A driver pin 136 is mounted in cap 132 generally along the diameter of the cap. This pin is connected to temperature sensor 134, which may be a bimetallic coil.

Expansion or contraction of the coil in response to temperature changes will cause the cap valve 132 to rotate on stem 12, thereby adjusting the water supply temperature.

The "set" temperature of the sensor 134 can be controlled by an external temperature control knob 138, as seen in FIG. 2 which, when rotated, will set the cap valve 132 in its starting or "set" position.

The sensor unit 15 is mounted on the tap body as described above. Its emitter and detector are connected to a controller circuit 5a, such as described, for example, in our previously filed patent applications. As mentioned, power for the circuit 5a and the motor 104 as well, is supplied from the battery case 30 or an external power source. Reflected infrared light received by detector 19 creates a pulse signal used to activate motor 104 and thus the primary valve 111.

Figure 4:
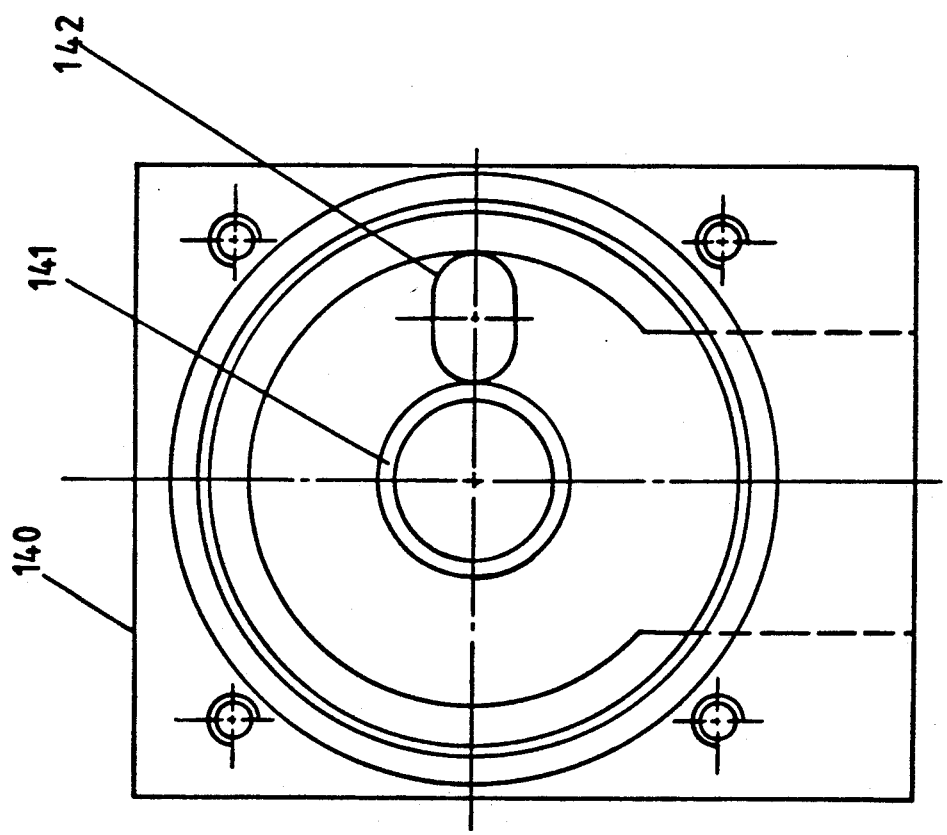
FIG. 4 is a partial sectional view with parts removed taken along line 4—4 of FIG. 2.
Figure 5:
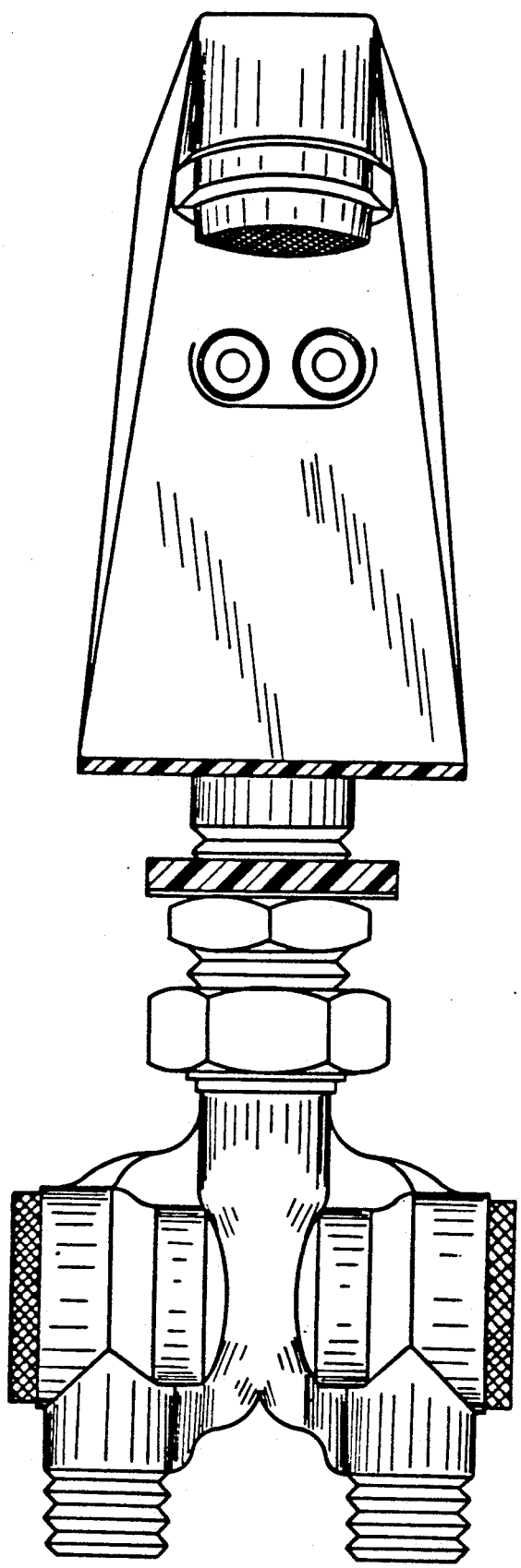
FIG. 5 is a front view of a faucet according to another embodiment of the invention wherein the emitter and detector are mounted on the faucet body.

In operation, water from supply ports 33, 34 flows through valve cap 132 into the chamber 140 of valve body 100 which contains the temperature sensor 134 (FIG. 2). This water will then flow from chamber 140 into chamber 101 through a port 142. This port is offset from the mounting boss 141 of the stem 143 of the temperature control knob 138, as seen in FIG. 4.

In the closed position of the valve, seen in FIG. 3, water entering chamber 101 is trapped between the upper flange 106' of valve 106 and the seal 106". In this closed position, flange 106' engages seal 113 located at the outlet 114 of chamber 101.

At the same time water from chamber 140 also enters the interior of valve piston 106 (and thus chamber 107) through a small port 144. As a result water pressure on opposite sides of valve cylinder 106 is the same. As previously noted, in this position the upper end of piston 106 is closed by the engagement of primary valve disk 111' against the seal 117 mounted in the upper end of piston 106. As a result the valve piston stays in the closed position shown in FIG. 3.

When sensor 15 detects the presence of a physical object a detecting signal is produced which serves to activate motor 104. As the motor is driven it turns the cam pin 120 through gear train 128, causing the cam to rotate through 180° to the position shown in FIG. 2. As a result, the stem 112 of valve 111 is pushed off center by the cam, against the bias of the spring 115. This causes valve 111 to tilt, as seen in FIG. 2.

When valve 111 is tilted, water within piston 106 passes through the now opened upper end of valve piston 106, through the porous frustro-conical spring 115. This water flows into the chamber 119 in valve body 100 to the outlet port 152 of the valve. This outlet port is connected by a tube (not shown) to the aerator end of the faucet. As a result of this water flow pressure within valve 106 (i.e., in chamber 107) is reduced below the pressure in the chamber 108 defined between flange 106' and seal 106". This causes valve piston 106 to move downwardly from the position shown in FIG. 3 to the position shown in FIG. 2 against the bias of spring 110. This movement opens port 114 to chamber 119 and permits water to flow directly from port 142 to chambers 101, 119 and thus to outlet port 152.

When the object, e.g. the user's hands, are removed from within the detecting range of sensor 15, a further signal is produced by the control circuit to again drive the motor 104 through 180°. This rotates cam pin 120 180° away from the position shown in FIG. 2 so that the stem 112 of valve 111 returns to its upright position under the influence of spring 115. This movement closes the top of valve piston 106. As a result pressure in valve 106 (i.e. in chamber 107) will increase and piston 106 will return to the closed position under the influence of the restoring spring 110. Accordingly port 114 is closed when flange 106' engages seal 113, thereby closing off water flow to the faucet.

Accordingly it is seen that a relatively simple valve structure is provided which will quickly respond to automatic control.

While the present invention has been particularly described with reference to a preferred embodiment, it will be appreciated by those skilled in the art that various changes and modifications may be made therein without departing from the scope or spirit of the invention. For example, use of the invention is not limited to faucets and may be adapted to other water supply facilities such as urinals or water closets.

What is claimed is:

1. A compact automatic water supply device comprising a hollow body defining an outer shell adapted to be located above the surface on which the device is to be mounted, said body having a water discharge outlet, sensing means mounted on said body for sensing the presence or absence of an object adjacent said device; an water supply valve in said body between said base and said water discharge outlet responsive to said sensing means sensing of an object for discharging water from said discharge outlet, said water supply valve including a diaphragm type primary valve, means for holding said diaphragm type primary valve in an open position as long as an object is sensed by said sensing means and for closing said diaphragm type primary valve when an object is removed from the range of detection of the sensing means, and a valve piston having upper and lower ends, said primary valve having a sealing dish selectively cooperating with the upper end of the valve piston to open and close said upper end and a stem extending through said open upper end of the valve piston, and means responsive to said sensing means for selectively tilting said stem to open said valve piston; said water supply valve further including a valve body, a valve chamber formed in said body with said valve piston being slidably mounted in said valve chamber for movement between opened and closed positions, said valve body having a water discharge port communicating with said valve chamber and being closed by said valve piston in the closed position thereof and a pair of water supply ports for supplying water to said camber, one of said ports supplying water to the interior of said valve chamber through it slower end and the other port supplying water to the chamber opposite the cylindrical wall of said valve piston.

2. The device as defined in claim 1, including separate temperature control means for adjusting the temperatures of water from the faucet.

3. The device as defined in claim 1 wherein said valve piston has sealing flanges at its upper and lower ends whereby water supplied to the chamber in the closed position of the valve is balanced by the pressure of water supplied to the lower end of the valve piston.

4. The device as defined in claim 3 including spring means for biasing said valve piston to its closed position.

5. The device as defined in claim 1 wherein said body is a faucet.

6. An automatic water supply device comprising a body having a water discharge outlet, sensing means mounted on said body for sensing the presence or absence of an object adjacent said device, and water supply valve means responsive to said sensing means for controlling discharge of water from said body; said sensing means including emitter means and detector means, said emitter and detector means being mounted on said body at an angle of between 0° and 70° to the vertical and at an angle of between 0° and 20° to each other; means for adjusting the position of said emitter and detector means relative to the vertical and the means for adjusting the angular position of said emitter and detector means relative to each other.

7. A device as defined in claim 6 wherein said body is a faucet and said emitter and detector means are mounted on the faucet.

* * * * *